United States Patent [19]

Midland

[11] Patent Number: 4,468,690
[45] Date of Patent: Aug. 28, 1984

[54] BEAM INDEX COLOR DISPLAY SYSTEM

[75] Inventor: Richard W. Midland, Inverness, Ill.

[73] Assignee: Zenith Electronics Corporation, Glenview, Ill.

[21] Appl. No.: 504,650

[22] Filed: Jun. 15, 1983

Related U.S. Application Data

[63] Continuation of Ser. No. 270,944, Jun. 5, 1981, Pat. No. 4,408,223.

[51] Int. Cl.³ .......................... H04N 9/22; H04N 9/24
[52] U.S. Cl. ...................................... 358/67; 340/750; 340/798
[58] Field of Search ...................... 358/66, 67, 69, 70; 340/723, 732, 733, 750, 798, 799, 800

[56] References Cited

U.S. PATENT DOCUMENTS 4,177,462 12/1979 Chung ................................. 340/703
4,193,071 3/1980 Hasegawa et al. .................. 340/723
4,247,869 1/1981 Culter et al. .......................... 358/67

*Primary Examiner*—Robert L. Richardson

[57] ABSTRACT

A display system is disclosed for receiving video data from a character generator and for applying that data to a beam index tube. The system includes a memory for storing data received from the character generator and for outputting the stored data in response to an index clock signal which is derived from a conventional index signal generated by the tube. Output circuitry receives the data from the memory and outputs that data to the tube at the proper times for illuminating phosphors within the tube. The preferred embodiment also drives the tube's beam current in a manner which develops a video image having improved contrast.

8 Claims, 8 Drawing Figures

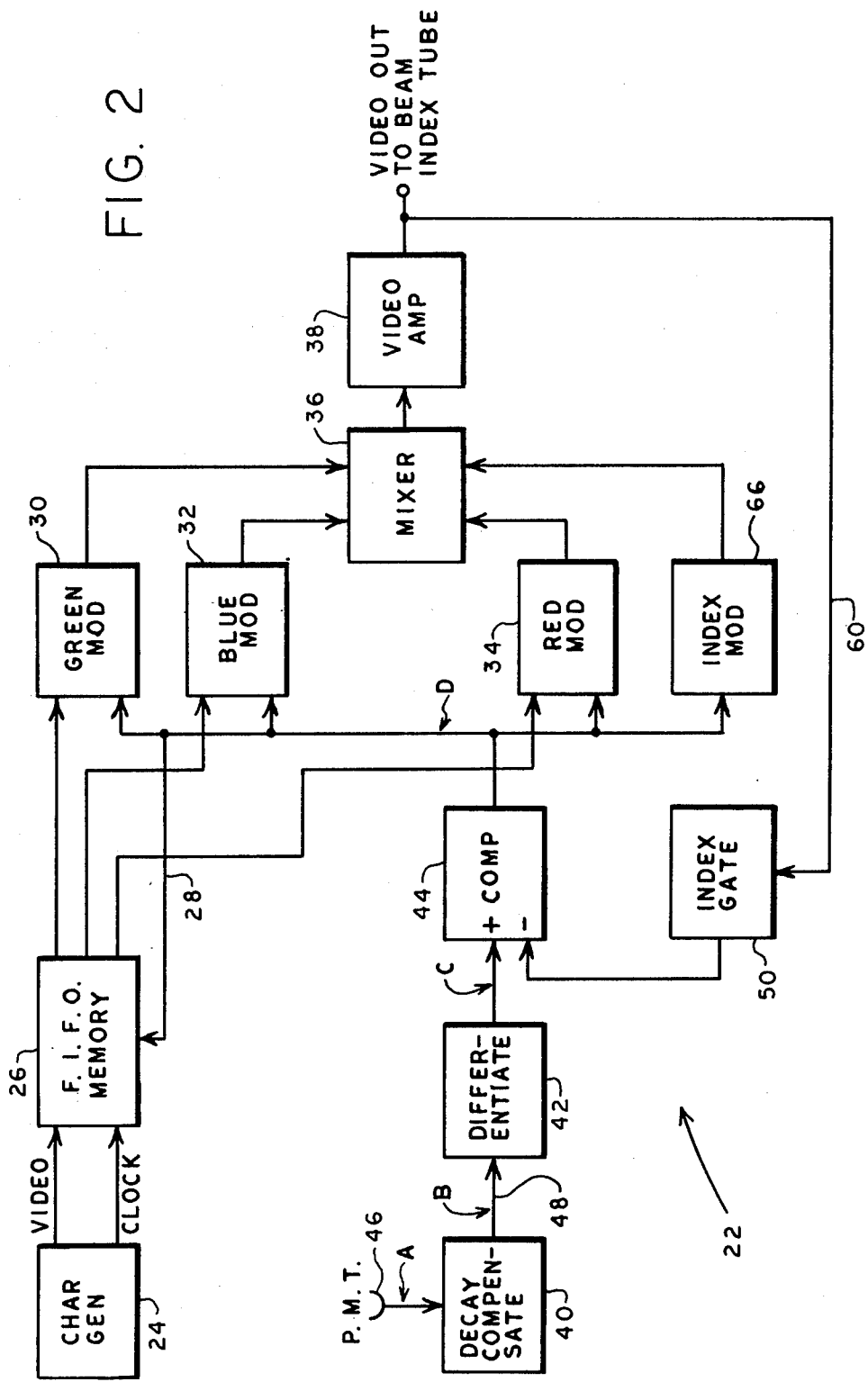

BEAM INDEX COLOR DISPLAY SYSTEM

This application is a continuation of application Ser. No. 270,944, filed June 5, 1981 and now U.S. Pat. No. 4,408,223.

BACKGROUND OF THE INVENTION

This invention is directed generally to improvements in a cathode ray tube display system of the type used in computer terminals and the like. It is particularly directed to a display system which employs a beam index tube for displaying a color image.

CRT (cathode ray tube) displays which require high resolution may employ a so-called beam index tube. The advantage of such tubes for this application are described in U.S. Pat. No. 4,247,869. Suffice it to say at this juncture that a beam index tube develops an index signal whose timing is indicative of the position of the tube's beam relative to the various phosphor strips on the tube's faceplate. The index signal may, therefore, be used to select and accurately display data at a predetermined location on the faceplate of the tube.

The prior art, and particularly the previously mentioned patent, suggest that the index signal developed by the beam index tube be used for two purposes: to sequentially select successive bits of data for application to the tube, and also to activate a character generator so as to generate the selected data. A disadvantage of such a system is that, by causing the tube to activate the character generator, the character generator is "slaved" to the tube rather than vice versa. Hence, the character generator must be specially designed to mate with the beam index tube. This is undesirable in many situations where it is desired to drive a beam index tube from various types of conventional character generators.

OBJECTS OF THE INVENTION

It is a general object of the invention to provide an improved CRT display system which employs a beam index tube.

It is a more specific object of the invention to provide such a display system which is adaptable for use with a wide variety of character generators such that the beam index tube is slaved to a character generator rather than vice versa.

BRIEF DESCRIPTION OF THE FIGURES

The objects stated above and other objects of the invention are set forth more particularly in the following detailed description of the accompanying drawings, of which:

FIG. 2 is a block diagram of CRT display system in accordance with the invention;

DESCRIPTION OF THE PREFERRED EMBODIMENT

The display system described herein is designed to receive data in the form of pixel video from a conventional character generator and to apply that data to a beam index tube so that each color component of each pixel modulates the tube's beam when the beam is at a relatively precise location with respect to corresponding color phosphors on the tube's faceplate. Thus, the characters or graphics defined by the data are accurately displayed on the tube's faceplate. In addition, the display system controls the tube's beam current in a manner that provides improved contrast in the video image.

A beam index tube of the type under consideration has, on its faceplate, phosphor stripes which are excited by an electron beam to emit visible light of three different colors. Multiple index stripes are interspersed at periodic intervals among the phosphor stripes for emitting light when excited by the electron beam. The light from the index stripes is typically received by a photomultiplier tube (PMT) for generating an index signal. One index signal is generated each time the electron beam scans an index stripe, and the index signals are used herein to control the application of data (video signals) to the beam index tube.

Figure 1:
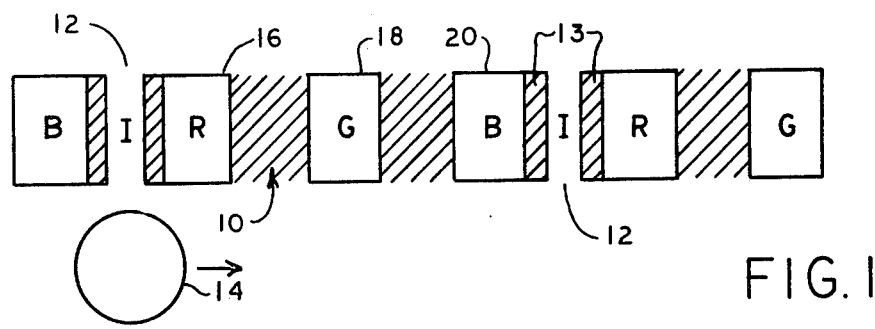
FIG. 1 is a schematic illustration of the phosphor pattern disposed on the faceplate of a conventional beam index tube.

To explain the operation of the beam index tube more specifically, reference is made to FIG. 1. As shown, the tube includes stripes of red-emissive (R), blue-emissive (B), and green-emissive (G) phosphors. A black, light absorbing material is disposed between adjacent phosphor stripes as indicated at 10.

Disposed between the blue and red phosphor stripes are relatively narrow index stripes 12, each of which may be sandwiched between black, light absorbing material as indicated by the cross hatched regions 13.

As the tube's electron beam 14 scans across the faceplate, it excites one of the index stripes 12, the light from which is picked up by a PMT (not shown). The index signal generated by the PMT synchronizes the display system's application of video to the tube with the scan of the electron beam 14. Thus, video data which is intended to be displayed by phosphor stripes 16, 18 and 20 is timely applied to the tube so that the beam 14 is modulated with the red portion of that data when the beam scans the red phosphor 16. Likewise, the green phosphor 18 and the blue phosphor 20 are excited, respectively, by the green and blue portions of the data as they are scanned by the beam.

Referring now to FIG. 2, a display system 22 is shown for receiving video data from a conventional character generator 24 and for applying that data to a beam index tube (not shown) in a synchronized manner. The character generator 24 may be any device which generates video such as characters, graphics and the like. Included in the system is a memory 26 which receives both video data and a conventional clock signal from the generator 24. As indicated in the drawing, the memory 26 is preferably a first in-first out (F.I.F.O.) memory which stores data received from the character generator and outputs it, a pixel at a time, in response to index clock signals on a lead 28. As described in more detail below, an index clock signal is generated each time the center of the index tube's bean excites an index stripe.

The system also includes output means in the form of a green modulator 30, a blue modulator 32, a red modulator 34, a mixer 36 and a video amplifier 38 for applying the video data received from the memory to the beam index tube in a given sequence. That is, each data pixel, (a red, a blue and a green video component intended to energize a red, blue and green phosphor, respectively) received from the memory 26 is applied to the tube so that the color components thereof arrive in the same sequence as the phosphor pattern in the tube.

The generation of the clock index signal is preferably accomplished by a decay compensate network 40, a differentiator 42 and a comparator 44. Briefly, the decay compensate network receives an index signal A (see FIG. 3) from a PMT 46 each time the tube's beam excites an index stripe, and develops an output pulse B on lead 48 which is timed to substantially coincide with the scanning of an index stripe by the center of the tube's electron beam.

The differentiator 42 differentiates the pulse on lead 48 and the comparator 44 converts the differentiated pulse C to an index clock signal D. As described more fully hereinafter, the comparator 44 also receives an inhibit signal from an index gate 50 to prevent the generation of an index clock signal when video data is being applied to the index tube.

Figure 4:
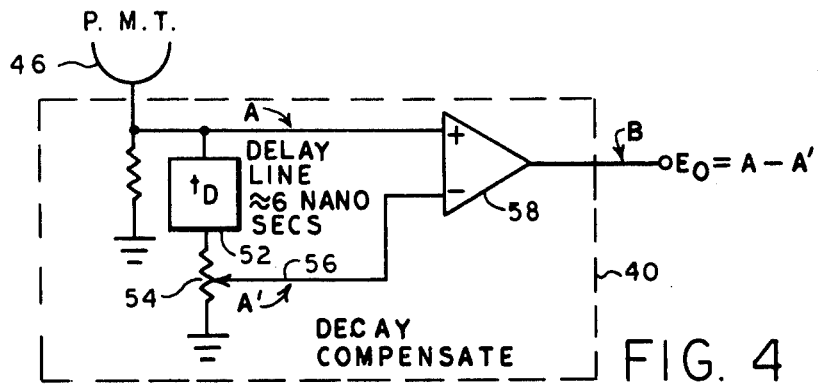
FIG. 4 is a schematic diagram of the decay compensate network shown in FIG. 2.

The detailed construction of the decay compensate network is shown in FIG. 4. As shown, the output of the PMT 46 is applied to a time delay network 52 which may be a delay line providing about a six nanosecond delay. The delayed output of the network is coupled to ground through a variable resistor 54.

Figure 5:
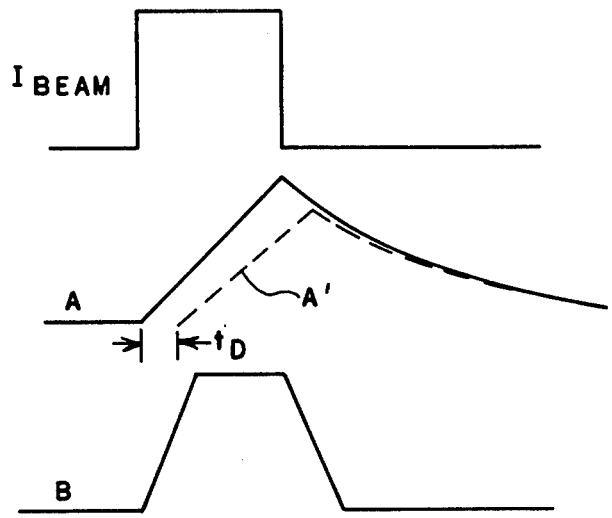
FIG. 5 illustrates waveforms useful in explaining the operation of the decay compensate network.

A wiper arm 56 couples a portion of the delayed signal to the inverting input of an amplifier 58, the noninverting input of which receives the output of the PMT. The purpose of this arrangement is to develop a pulse signal B (FIG. 5) which is substantially coincident with the beam index energy (I beam) which excites an index stripe, thereby to compensate for the delayed output of the PMT due to delayed response of the index stripe phosphor. By subtracting the delayed signal A' on the wiper arm from the signal A, a pulse output B is obtained which is in substantial alignment with the waveform of the beam index energy.

Figure 3:
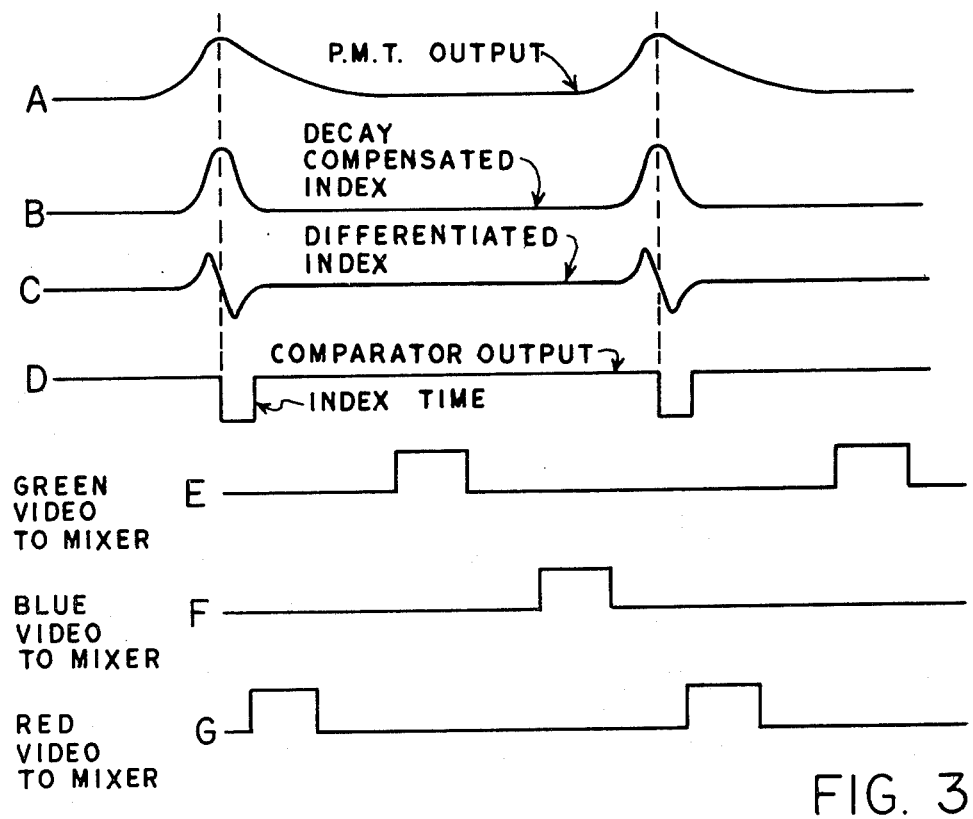
FIG. 3 illustrates various waveforms useful in explaining the operation of the display system.

Returning to FIG. 2, the differentiator 42 is conventional and develops an output as shown by signal C in FIG. 3. The comparator 44 is also of conventional construction for generating an index clock signal D which occurs a small but fixed time after the tube's beam excites an index stripe.

When the index clock signal is generated, the memory 26 is triggered to output a pixel of green video data to the green modulator 30, a pixel of blue video data to the blue modulator 32, and a pixel of red video data to the red modulator 34. All three modulators also receive the index clock signal for developing properly timed video outputs so that the video data causes phosphor stripes of the proper color and location to be excited.

The data output from the red, blue and green modulators may be applied to a mixer 36 which operates as a conventional OR gate. The mixer's output may be applied to a conventional video amplifier 38 which drives a modulation control electrode of the beam index tube.

The function of the index gate 50 will now be described more specifically. As the tube's electron beam excites a phosphor stripe such as the phosphor 20 in FIG. 1, part of the beam may also fall on the adjacent index stripe. Likewise, as the beam excites the next successive red phosphor, part of the beam may still excite the adjacent index stripe. Thus, false index signals may be generated which degrade the accurate timing of the index clock signal.

To overcome this problem, the index gate 50 senses, via a lead 60, the video data being applied to the beam index tube. When any such data is sensed, the comparator 44 is inhibited from generating an index clock signal. Thus, an index clock signal can only be generated in response to a PMT output caused by the tube's beam striking at or near the center of an index stripe.

Figure 6:
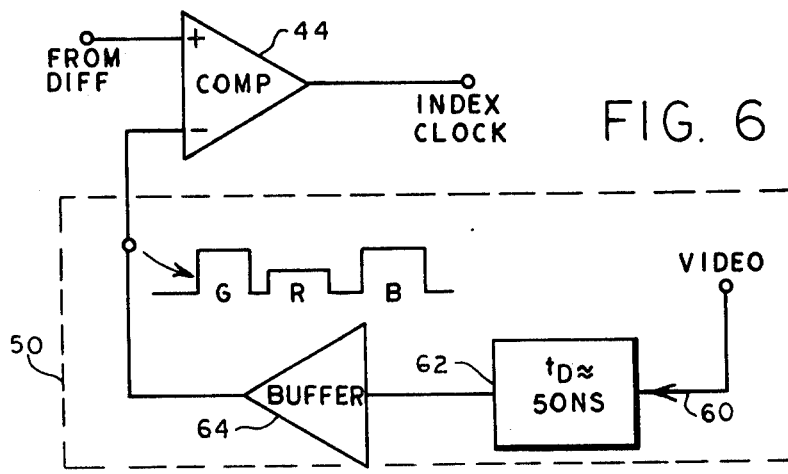
FIG. 6 is a schematic diagram of the index gate shown in FIG. 2.

Referring to FIG. 6, an exemplary embodiment of the index gate is shown. It includes a time delay network 62 (a delay line, for example) which may delay the video data on lead 60 by about 50 nanoseconds to compensate for delays in the generation of the index clock signal. The delayed video output of the network 62 is applied via a buffer 64 to the inverting input of the comparator 44. Thus, any signals at the noninverting input of the comparator which are time coincident with the delayed video are inhibited from developing an output from the comparator.

Referring again to FIG. 2, the illustrated system preferably includes means in the form of an index modulator 66 for selectively modulating the index tube's beam current in a manner which provides improved contrast in the video image. In conventional beam index display systems, the tube's beam current is held on continuously during active scan time to ensure excitation of each index stripe as the beam scans across the tube. Further modulation of the tube's beam current is effected by video data when the beam is not in registration with an index stripe. Hence, the contrast in the video image is reduced because of the residual beam current which is held on continuously during active scan time.

In the present system, the index modulator 66 responds to each index clock signal for providing low level drive for the tube's beam current when it is expected that the tube's scan is in registration with an index stripe. At other times, the low level drive is terminated.

Another function of the index modulator comes into play when an output of the PMT is expected but none occurs, as when the tube contains a defective or missing index stripe. Under these conditions, the index modulator applies low level drive for the tube's beam current during a time "window" when the beam is expected to be in registration with the next successive operative index stripe. If such a stripe is found, another index clock signal is generated and the low level drive is terminated. Improved contrast results.

Figure 7:
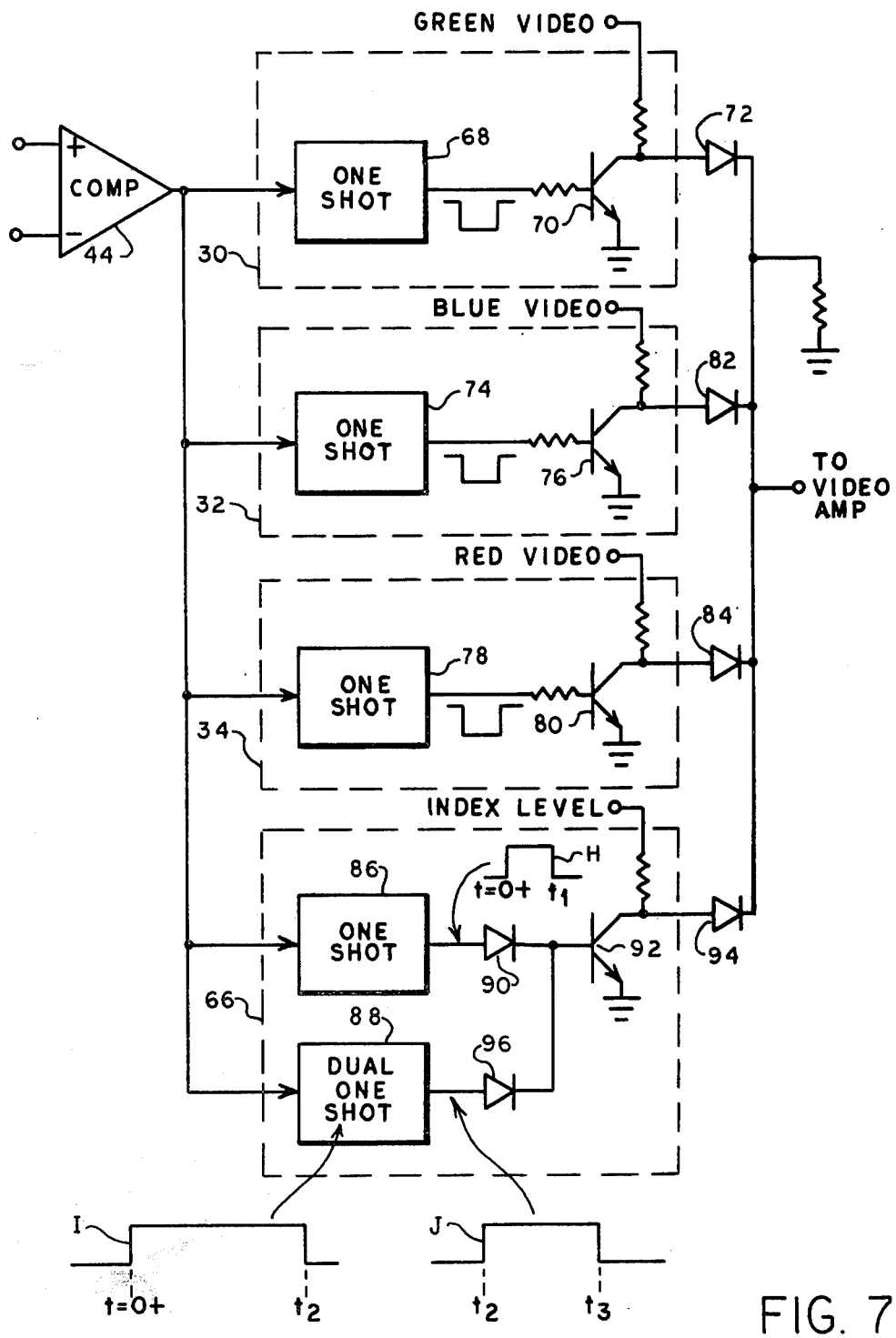
FIG. 7 is a schematic diagram of the green, blue, red and index modulators as well as the mixer shown in FIG. 2.

Preferred embodiments of the index modulator and the color modulators are shown in FIG. 7, to which reference is now made. The color modulators are described first.

The illustrated green modulator 30 includes a monostable multivibrator or one-shot 68 which receives the index clock signal from the comparator 44. The output of the one-shot drives a grounded emitter transistor 70 whose collector receives green video from the memory. The collector of the transistor 70 is coupled via a diode 72 to the video amplifier 38 (FIG. 2).

The one-shot 68 triggers when it receives the index clock signal and develops an output pulse whose timing is selected to turn off the transistor 70 when the tube's beam is in registration with the green phosphor stripe (phosphor 18 in FIG. 1, for example) which the data from memory is intended to excite. Hence, the green video data is coupled via the diode 72 to the video amplifier. Waveform E of FIG. 3 illustrates the video which is applied to the diode 72 for exciting the phosphor 18 and the next successive green phosphor.

The blue modulator 32 and the red modulator 34 may be identical in construction to the green modulator. The only difference is that a one-shot 74 in the blue modulator turns off a transistor 76 when the tube's beam is in registration with the proper blue phosphor, and a one-shot 78 in the red modulator turns off a transistor 80 when the tube's beam is in registration with the proper red phosphor. Waveforms F and G of FIG. 3 illustrate the video applied to diodes 82 and 84.

Referring to the index modulator 66, it includes a one-shot 86 and a dual one-shot 88. The one-shot 86 responds to an index clock signal from the comparator 44 for generating an output pulse H. This pulse is applied via a diode 90 to the base of a transistor 92, the collector of which receives a potential indicated as index level. The potential of the index level is selected to cause the beam current of the tube to be at a relatively low level, but sufficient to properly excite the index stripe. A diode 94 carries the output of transistor 92 to the video amplifier. It can be seen that the diodes 72, 82 and 94 serve the function of the mixer 36 shown in FIG. 2.

The dual one-shot 88 responds to an index clock signal for generating an internal pulse I, the falling edge of which causes an output pulse J to be applied to the base of transistor 92 via a diode 96. As described below, the pulses H, I and J are used to apply the index level potential to the tube at the correct times.

Figure 8:
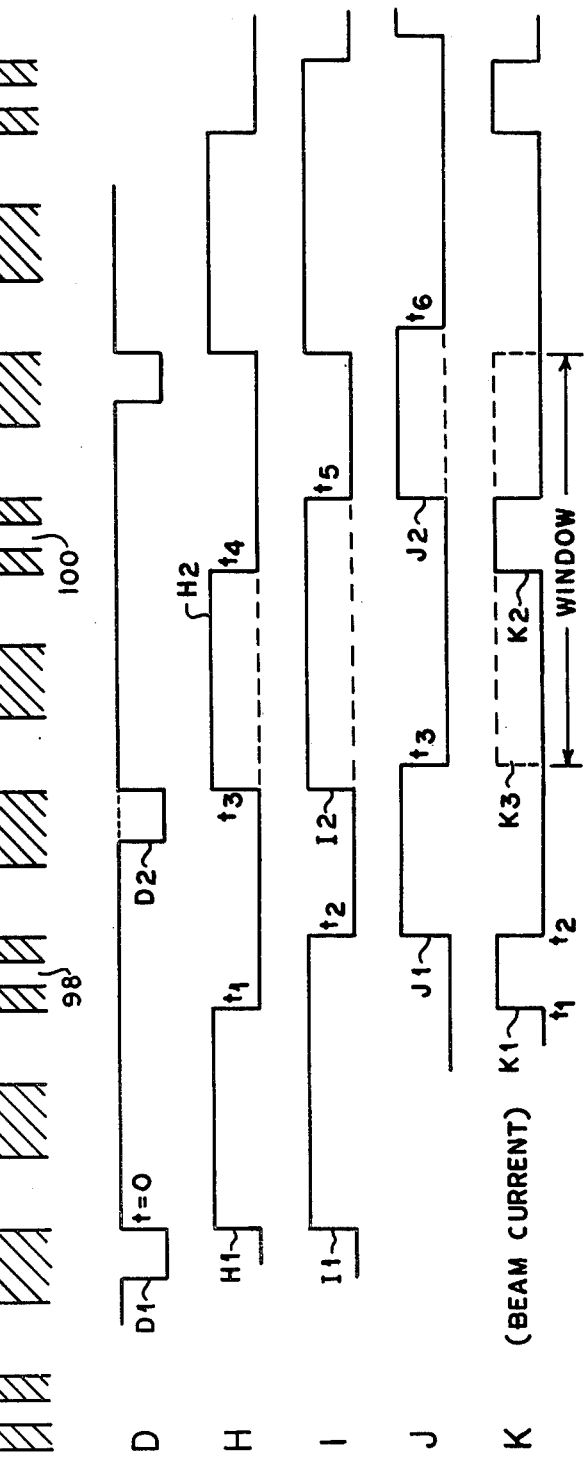
FIG. 8 illustrates various waveforms useful in describing the operation of the index modulator shown in FIG. 6.

The operation of the index modulator is best explained with reference to FIG. 8. The clock index signal D and other waveforms are shown below a schematic representation of phosphor and index stripes to indicate their relative occurrence. Signals which are actually developed in response to an output of the PMT are shown in solid lines, whereas dashed lines are shown to illustrate the conditions of the various signals when no PMT output is developed. Also, waveform K (beam current) is shown for a condition in which a black raster (no video) is being generated in order to illustrate the operation of the index modulator more clearly.

As shown at time t=0, the trailing edge of an index clock signal $D_1$ is generated in response to an index signal from the PMT. At about the same time, the one-shot 86 outputs a pulse $H_1$ which automatically terminates at time $t_1$, and the dual one-shot 88 generates an internal pulse $I_1$ which automatically terminates at time $t_2$.

In response to the descending edge of pulse $I_1$, the dual one-shot 88 outputs a pulse $J_1$ which automatically terminates at time $t_3$.

With the arrangement shown in FIG. 7, the transistor 92 is turned on when either of the signals H or J is high, and it is turned off when neither of those signals is high. Hence, between times $t_1$ and $t_2$, the transistor 92 is held off so that the index level potential is applied to the tube to generate a relatively low level (10 microamperes, for example) electron beam pulse $K_1$ for exciting an index stripe.

At times earlier than $t_1$, at least one of the signals H and J are high for turning on the transistor 92 and removing the index level potential from the tube. The index level potential is also removed immediately subsequent to $t_2$ so that only the index stripe 98 is excited by the electron beam. The phosphors immediately preceding and following the index stripe will ordinarily be excited by a much greater electron beam in response to video outputs from the color modulators.

As the tube's electron beam strikes the index stripe 98, another PMT output results in a further index clock signal $D_2$ being generated. Hence, at time $t_3$, the one-shot 86 generates a pulse output $H_2$ which terminates at time $t_4$. In addition, the dual one-shot 88 develops a pulse $I_2$ which terminates at time $t_5$. At that time, the dual one-shot outputs a pulse $J_2$ which terminates at time $t_6$. Because the pulses $H_2$ and $J_2$ are both low only between times $t_4$ and $t_5$, another beam current pulse $K_2$ is developed then for exciting an index stripe 100. This operation continues repeatedly so that the tube's beam current is turned on to a low level only when the beam is in position to excite an index stripe. The description below illustrates the operation of the index modulator when an expected PMT output does not occur.

Assume now that the index stripe 98 is either missing or defective, wherefore the PMT does not generate an output. In that case, the comparator 44 does not generate the index clock signal $D_2$ (as indicated by the dashed line at $D_2$). Consequently, the pulse $H_2$ is not developed by the one-shot 86 and the pulses $I_2$ and $J_2$ are not developed by the one-shot 88. Because the signals H and J both remain low between times $t_3$ and $t_6$, the transistor 92 remains off during that interval to supply the index level potential to the tube. Hence, a low level beam current pulse $K_3$ is generated in the interval between times $t_3$ and $t_6$. This latter pulse thus occurs during a time "window" during which the beam expects to find the next successive index stripe 100. If that index stripe is found, the beam current is turned off and the normal mode of operation described above resumes.

From the foregoing description, it will be apparent that the present display system meets its objective of slaving a beam index tube to a character generator rather than having the character generator slaved to the tube. Such a display system may be combined with a beam index tube in a single package and used with a wide variety of character generators.

In addition, the present display system provides a video image with high contrast using relatively inexpensive circuitry.

Although the invention has been described in terms of a preferred embodiment, it will be obvious to those skilled in the art that many alterations and modifications may be made without departing from the invention. Accordingly, it is intended that all such alterations and modifications be considered as within the spirit and scope of the invention as defined by the appended claims.

What is claimed is:

1. In a system having a beam index tube which generates a periodic index signal as the tube's beam strikes index strips within the tube, a display system for driving the tube with video data comprising:
   means responsive to the index signal for generating an index clock signal;
   means for supplying said video data to said tube in response to said index clock signal; and
   gate means responsive to supplying of said video data to said tube coupled to said index clock signal generating means for inhibiting generation of the index clock signal.

2. The system of claim 1 further including output means for receiving said video data and for supplying it in a given sequence for application to said tube.

3. The system of claim 2 wherein said output means includes three modulators each of which receives data for energizing a respective one of the color phosphors in said tube and each of which times its output to substantially coincide with the tube's electron beam being incident on its respective color phosphor.

4. In a system having a beam index tube which generates a periodic index signal as the tube's beam strikes index strips within the tube, a display system for driving the tube with video data comprising:
   means responsive to the index signal for generating an index clock signal;
   output means receiving video data and for outputting the data in a given sequence in response to said index clock signal for application to said tube;
   three modulators in said output means, one for each of the color phosphors in said tube, said modulators timing their outputs to substantially coincide with the tube's beam being incident on its respective color phosphor; and
   gate means coupled to said output means and to said index clock signal generating means for inhibiting generation of said index clock signal whenever video data is being applied to said tube.

5. In a system having a beam index tube which generates a periodic index signal as the tube's beam strikes index strips within the tube, a display system for driving the tube with video data comprising:
   means responsive to the index signal for generating an index clock signal,
   output means for delivering video data to said tube responsive to said index clock signal; and
   indexing means responsive to the index clock signal for providing a relatively low level drive for the tube's beam when said beam is in position to excite a next index strip and for removing said drive when said beam is between index strips so that index strip excitation is accomplished on an as-needed basis, whereby contrast of the tube's video image is improved.

6. In a beam index display system including a beam index tube having a display screen of periodic stripes of different colored light-emitting phosphors and a pattern of index strips interspersed in a regular manner among the phosphor stripes comprising:
   index signal generating means for developing an index clock signal as a function of the electron beam in said tube striking said index strips;
   a source of video information;
   modulator means coupled to said source of video information and supplied with said clock signal for supplying said video information to modulate said electron beam in said tube in a sequential manner;
   and means for enhancing the video contrast of said index tube including indexing means responsive to said clock signal for applying a low level drive to said electron beam when a next index strip is anticipated and for substantially disabling said drive between index strips.

7. The system of claim 6 wherein said indexing means include;
   pulse generator means responsive to said index clock signal for generating pulses which begin at the occurrence of the index clock signal and when said electron beam has passed an index strip, respectively.

8. The system of claim 7 wherein said pulse generator means comprise;
   a first pulse generator for generating a first pulse which begins substantially at the occurrence of the index clock signal and which ends just prior to said electron beam being in position to excite an index strip;
   a second pulse generator for generating a second pulse which begins just after said electron beam has passed an index strip and which ends at about the termination of the next successive index clock signal;
   circuit means for applying a low level drive to said electron beam; and
   means for receiving the first and second pulses coupled to said circuit means, for disabling said circuit means to substantially turn off said electron beam when either of the first and second pulses occur and for enabling the circuit means when neither of said pulses occur so as to turn said electron beam on.

* * * * *